United States Patent
Bennett et al.

(10) Patent No.: US 6,278,733 B1
(45) Date of Patent: Aug. 21, 2001

(54) SYSTEM AND METHOD FOR DIGITALLY ENCODING AND COMPRESSING ANALOG SIGNALS CARRIED IN THE VERTICAL BLANKING INTERVAL OF TELEVISION SIGNAL

(75) Inventors: Christopher J. Bennett, San Diego, CA (US); Maximilien d'Oreye de Lantremange, Kraainem (BE)

(73) Assignee: Tiernan Communications, Inc., San Diego, CA (US)

( * ) Notice: Subject to any disclaimer, the term of this patent is extended or adjusted under 35 U.S.C. 154(b) by 0 days.

(21) Appl. No.: 08/902,174

(22) Filed: Jul. 29, 1997

Related U.S. Application Data
(60) Provisional application No. 60/022,800, filed on Jul. 30, 1996.

(51) Int. Cl.[7] ................................................ H04N 7/12
(52) U.S. Cl. ........................ 375/240; 375/27; 725/114; 725/131; 725/67; 345/327
(58) Field of Search ................................ 348/304, 423, 348/461–468, 385, 478; 358/141, 145

(56) References Cited

U.S. PATENT DOCUMENTS

| | | | |
|---|---|---|---|
| 4,608,690 | * 8/1986 | Judge | 371/21 |
| 4,691,233 | * 9/1987 | Acampora | 375/240 |
| 4,866,522 | * 9/1989 | Beckley | 358/145 |
| 5,068,729 | * 11/1991 | Katznelson et al. | 358/141 |
| 5,121,211 | * 6/1992 | Koo | 358/187 |
| 5,319,707 | 6/1994 | Wasilewski et al. | 380/14 |
| 5,335,009 | * 8/1994 | Sun et al. | 348/614 |
| 5,400,401 | 3/1995 | Wasilewski et al. | 380/9 |
| 5,493,339 | 2/1996 | Birch et al. | 348/461 |
| 5,519,780 | 5/1996 | Woo et al. | 380/49 |
| 5,532,748 | * 7/1996 | Naimpally | 348/432 |
| 5,543,852 | * 8/1996 | Yuen et al. | 348/478 |
| 5,555,025 | 9/1996 | McArthur | 348/478 |
| 5,574,495 | * 11/1996 | Caporizzo | 348/13 |
| 5,612,789 | * 3/1997 | Nagura | 386/65 |
| 5,619,274 | * 4/1997 | Roop et al. | 348/461 |
| 5,737,595 | * 4/1998 | Cohen et al. | 395/611 |
| 5,778,064 | * 7/1998 | Kori et al. | 386/37 |
| 5,801,782 | * 9/1998 | Patterson | 348/473 |
| 5,822,425 | * 10/1998 | Ezaki et al. | 380/5 |
| 6,006,256 | * 12/1999 | Zdepski et al. | 348/12 |

FOREIGN PATENT DOCUMENTS

| | | | |
|---|---|---|---|
| 0 723 376 A2 | * 1/1995 | (EP) | H04N/7/52 |
| 0723376A2 | 7/1996 | (EP) | |
| 0740474 | 10/1996 | (EP) | |
| WO 95/06391 | 3/1995 | (WO) | |
| WO 95/15660 | 6/1995 | (WO) | |
| WO 97/01930 | 1/1997 | (WO) | |

OTHER PUBLICATIONS

"Studio Encoding Parameters of Digital Television for Standard 4:3 and Wide–Screen 16:9 Aspect Ratios," ITU–R BT.601–5, pp. 1–17 (1982).

Teletext Systems, ITU–R Recommendation 653–2, pp. 1–29 (1994).

(List continued on next page.)

*Primary Examiner*—Chris Kelley
*Assistant Examiner*—Shawn S. An
(74) *Attorney, Agent, or Firm*—Hamilton Brook Smith & Reynolds, P.C.

(57) ABSTRACT

A system and method are disclosed for digitally representing reference and data signals transmitted in the vertical blanking interval (VBI) of an analog television waveform such as NTSC or PAL. The system includes means for compressing the digital representation of the VBI signals. A broad range of reference and data signals is capable of being represented. The compressed representations of the VBI signals are particularly suitable for inclusion in an MPEG2 compliant signal carrying compressed digital video and audio.

31 Claims, 4 Drawing Sheets

OTHER PUBLICATIONS

"Joint EIA/CVCC Recommended Practice for Teletext: North American Basic Teletext Specification (NABTS)," EIA–516, pp. 1–81, Electronic Industries Assoc., (May 1988).

"Signal Specification for Line 21," EIA Recommendation R–4.3, pp. 1–66, (Sep. 1992).

"Time and Control Code," Video and Audio Tape for 525–line/60–field Systems, ANSI/SMPTE Recommendation 12M–1986 (Jan. 1986).

"Specification of Insertion Data Signal Equipment for International Transmissions," EBU Tech. 3217–E, pp. 1–19, (Jun. 1977).

"Digital Broadcasting Systems for Television, Sound and Data Services; Specification for Conveying ITU–R System B Teletext in Digital Video Broadcasting (DVB) Bitstreams," ETS 300 472, pp. 1–12 (May 1995).

"Reference Signals for Ghost Cancelling in Television,"ITU–R Recommendation 1124, (Mar. 1994).

Whittler, J. C., "Television Engineering Handbook", Revised Edition, pp. 21.54–21.57 (1992).

"PALplus System Specification," pp. 1–29 (Jun. 1994).

"Time and Control Code", Proposed SMPTE Standard—Revision of ANSI/SMPTE 12M–1986, SMPTE Journal (Apr. 1993).

Stammnitz, P. and Gruneberg, K., "Hardware Implementation of the Transport Stream Demultiplexer for the $^H$DTV$_T$ Demonstrator," Signal Processing of HDTV, Elsevier Science B.V., pp. 435–441 (1995).

* cited by examiner

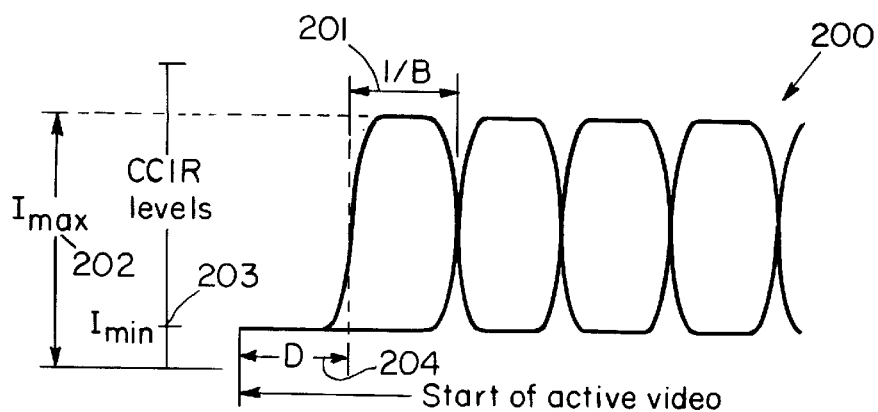
FIG. 4A
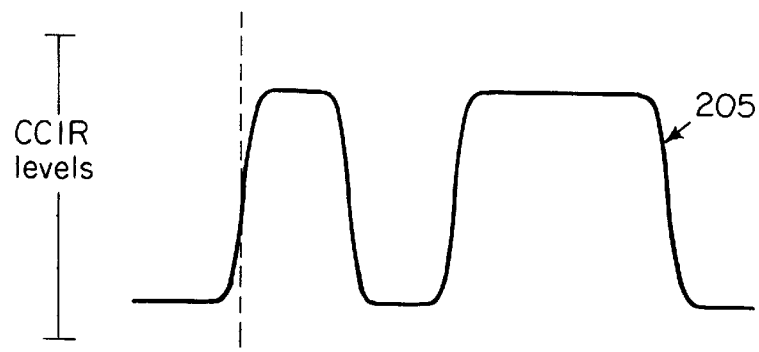
FIG. 4B
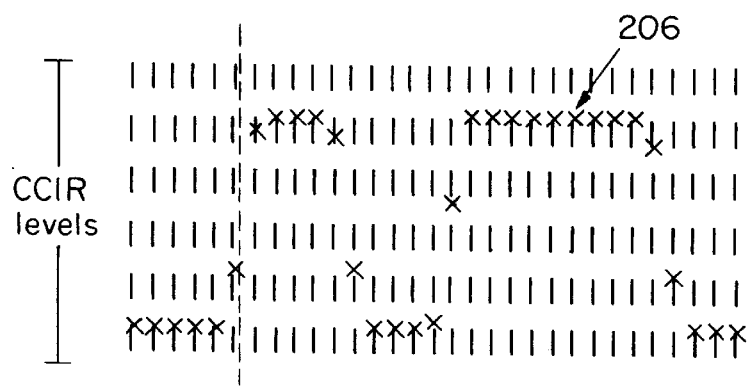
FIG. 4C
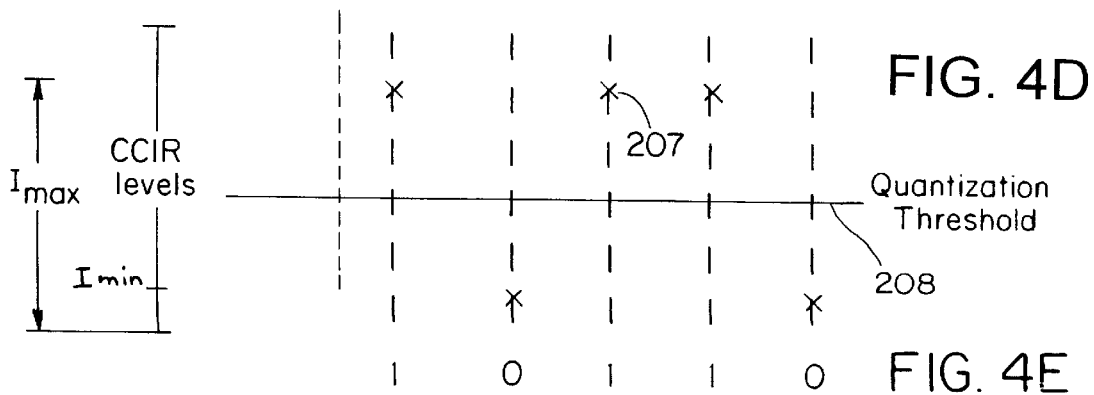
FIG. 4D
FIG. 4E

SYSTEM AND METHOD FOR DIGITALLY ENCODING AND COMPRESSING ANALOG SIGNALS CARRIED IN THE VERTICAL BLANKING INTERVAL OF TELEVISION SIGNAL

RELATED APPLICATION

This application claims priority to U.S. Provisional Application No. 60/022,800, filed Jul. 30, 1996, which is incorporated herein by reference in its entirety.

BACKGROUND OF THE INVENTION

A conventional analog television waveform such as the system defined by the National Television Standards Committee (NTSC), used in the United States and certain other countries such as Canada, Japan and Korea, and the Phase Alternate Line (PAL) system used in most European countries and certain other countries such as Australia, includes a standard number of horizontal scanning lines that contain video information intended for display by a television receiver. However, the first several lines, referred to as the vertical blanking interval (VBI), are used to transmit test and reference signals as well as data services.

Significant efforts have been made to establish standards for transmission of digital representations of video and audio data in various media. The International Organization for Standardization (ISO) has adopted a standard (ISO/IEC 13818-1) that addresses the combining of one or more "elementary streams" of video and audio, as well as other data, into single or multiple streams suitable for storage or transmission. The ISO/IEC 13818-1 standard, hereinafter referred to as the "MPEG-2 Systems" standard, is described in detail in the ISO draft document "Generic Coding of Moving Pictures and Associated Audio", ISO/IEC JTC1/SC29/WG11 N0801 (Nov. 13, 1994), which is incorporated herein in its entirety by reference. However, in order to replace conventional analog broadcasting systems it is also necessary to define encoding means for the signals carried in the VBI, so that they may be reconstructed by the receiving equipment and decoded by conventional analog equipment.

Standards have been established for representation and transport of Teletext in MPEG2 by the Digital Video Board (DVB), which is the predominant user of the VBI in 625-line systems in Europe, particularly in consumer applications. See "Digital Broadcasting Systems for Television Sound and Data Services; Specification for Conveying ITU-R System B Teletext in Digital Video Broadcasting (DVB) Bit streams", ETS 300 472, May 1995 (hereinafter DVB Teletext). However, no standards have been defined by DVB or other bodies to handle representation and transport of other types of VBI signals, such as Vertical Interval Test Signal (VITS), Vertical Interval Reference (VIR), Ghost Cancellation Reference Signals (GCR), North American Broadcast Teletext System (NABTS), Line 21 Closed Captioning (CC), Vertical Interval Time Code (VITC), Insertion Data for EBU Interchange (EBU 3217), and Wide Screen Signaling (WSS), used in PALplus.

In addition, certain proprietary systems are permitted for transmission in the VBI by the Federal Communications Commission (FCC), such as the Automatic Measurement of Lineups (AMOL) system of the Nielsen Corporation. Additional systems may be permitted from time to time.

SUMMARY OF THE INVENTION

The present invention relates to the representation and transmission in digital form of information that is transmitted in analog form in the Vertical Blanking Interval (VBI) of a conventional analog television waveform.

It is an object of the present invention to provide means of digitally encoding a VBI signal which are not specific to the characteristics of the particular standard governing the signal format in the analog domain, but instead depend upon certain broad characteristics of the signal. By this means a universal VBI encoding system may be implemented which is applicable to all known currently defined standards and privately defined systems, and may be extended to encode other systems not currently identified or devised.

It is a further object of the present invention to provide means of digitally encoding VBI signals which are digitally efficient, so that the VBI signals may be represented in a compressed form. By this means, the signal representation of the present invention is suitable for inclusion in a multiplex of digital signals along with compressed video and audio signals, such as are defined by MPEG2.

It is a further object of the present invention to provide means for transmitting the encoded VBI signals which are compatible with MPEG2 systems, and in particular means for transmitting encoded VBI signals which are compatible with the Universal Messaging System disclosed in U.S. application Ser. No. 08/675,558 entitled "Method for Universal Messaging and Multiplexing of Video, Audio and Data Streams", the content of which is incorporated herein by reference in its entirety. By these means it is possible to provide certain facilities for managing and controlling VBI signals which are difficult or not possible with conventional analog systems, such as providing a choice of signals for output on particular lines of the VBI, or providing conditional access to VBI signals.

Accordingly, an encoding apparatus for encoding a television signal having video information and VBI information includes a video encoder and a VBI encoder. The video encoder encodes and compresses the video information to provide a compressed digital video stream. The VBI encoder encodes and compresses the VBI information to provide a compressed VBI information stream. A multiplexer coupled to the video encoder and the VBI encoder multiplexes the compressed digital video stream with the compressed VBI information stream to provide an output transport stream. The compressed VBI information stream is preferably a VBI message stream.

According to an aspect of the invention, the VBI encoder encodes and compresses the VBI information according to encoding parameters received from an external configuration control system, the encoding parameters being indicative of a VBI data type associated with the VBI information.

According to another aspect of the invention, the multiplexer multiplexes an externally generated VBI information stream with the compressed VBI information stream and the compressed digital video stream.

According to another aspect of the invention, for VBI information having the form of a VBI data signal, the VBI encoder includes a sampling circuit for sampling the VBI data signal to provide a sequence of luminance samples. A decimator in the VBI encoder decimates the sequence of luminance samples to provide a sequence of decimated samples that are quantized by a quantizer to provide a sequence of VBI data bits. A stream generator constructs a compressed VBI information stream from the sequence of VBI data bits. For VBI information having the form of a VBI reference signal, the VBI encoder includes means for constructing a compressed VBI information stream from the sequence of samples at a broadcast interval.

According to yet another aspect of the invention, a decoding apparatus for decoding a transport stream having a compressed digital video stream and compressed VBI information streams includes a demultiplexer that demultiplexes the transport stream to separate the compressed digital video stream and the compressed VBI information streams. A video decoder coupled to the demultiplexer decodes the compressed digital video stream to provide a decompressed video signal. A VBI decoder also coupled to the demultiplexer decodes the compressed VBI information stream to provide a VBI information signal. A combiner combines the decompressed video signal and the VBI information signal to provide an output video signal.

The term "reference signals" is used in this disclosure to mean reference signals, test signals, or both.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIGS. 4A–4E illustrate VBI signal encoding of the present invention.

DETAILED DESCRIPTION OF THE PREFERRED EMBODIMENTS

Figure 1A:
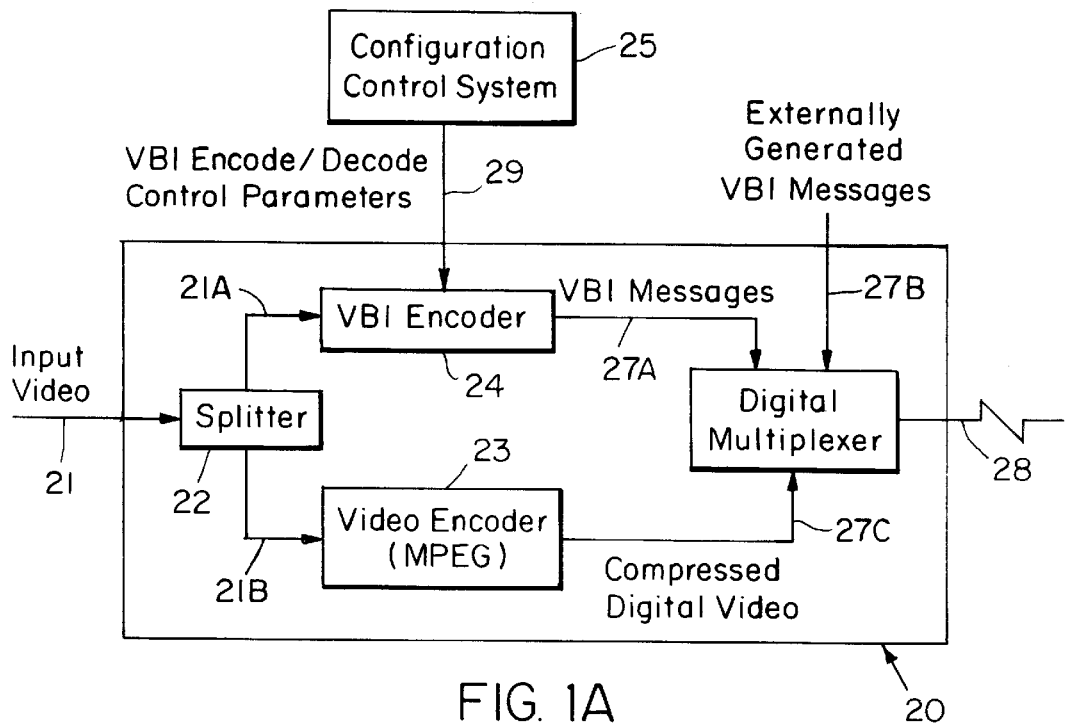
FIGS. 1A an 1B are schematic block diagrams of a system of the present invention which includes an encoding apparatus and a decoding apparatus.

We first survey the signals permitted in the VBI in order to determine the general characteristics of such signals. VBI signals are transmitted for three purposes: test, reference and data transmission.

Considering first test and reference signals, these signals are intended to permit measurements of an analog signal, or to provide receivers of such a signal with the ability to compensate for distortions which may have occurred during transmission. For many purposes, therefore, they may simply be omitted from digital transmissions. However, in certain instances it may be necessary to represent them in such transmissions, for example:

To provide means for inclusion of test and reference signals in the analog signal output by a digital decoder, so that such signals may be re-transmitted in conventional analog form to remote receivers, without requiring special-purpose reconstruction circuitry in the digital decoder.

To provide means for measuring remotely distortions which may have occurred prior to the digital encoding of an analog signal, whether or not such distortions are corrected by preprocessing the analog signal in the digital encoder.

We now discuss the test and reference signals provided for use with NTSC systems, namely VITS, VIR and GCR. Further discussion of VITS and VIR signals may be found in J. C. Whittler (ed.): "Television Engineering Handbook", Revised Edition, 1992. GCR signals are defined in "Reference Signals for Ghost Cancellation in Television", ITU-R Recommendation 1124, March 1994 which is incorporated herein by reference. Similar signals are defined for use with PAL systems, and the remarks made here are applicable to these systems.

VITS signals consist of a defined suite of analog signals, consisting of several segments of defined frequency, amplitude and phase. Each VITS signal is located in a specific line of a specific field of each frame of an NTSC or PAL signal.

The VIR signal is specific to NTSC and is transmitted in line 19 of each field of a frame. It provides reference levels for black at IRE 7.5, for luminance at IRE 50, and a reference signal for chrominance centered on IRE 70 which is in phase with the analog signal color burst. This phase repeats on a four-field cycle, as follows: +−−+.

The defined GCR signals provide a reference signal which may be used to detect and correct for the effects of signal reflections due to multipath. Three systems are defined, two (Systems A and B) for use with NTSC signals and a third (System C) for use with both NTSC and PAL signals:

GCR-A consists of a pair of waveforms, the GCR waveform (hereafter labeled A) which may occur in two variants (A' and A") so that it is in phase with color burst, and the "zero-pedestal" (hereafter labeled B). These are transmitted in an 8-field cycle and in phase with color burst, as follows: A'+B−A"−B+B+A"−B−A'+.

GCR-B consists of a defined ternary sequence transmitted in either positive or negative polarity with a fixed relationship to color burst phase in a 4-field cycle as follows (where the first polarity of a pair is that of GCR-B and the second is that of color burst): −/+, +/−, −/−, +/+.

GCR-C consists of a defined signal uniformly varying in frequency and transmitted in either positive or negative polarity with no defined relationship to color burst phase. In 525 line systems, GCR-C is transmitted in an 8-field cycle as follows +−+−−+−+. In 625 line systems GCR-C is transmitted in the second field of each frame, alternating in positive and negative polarity.

Thus, it will be apparent that test and reference signal standards exercise the luminance and chrominance processing of a receiver. Each signal may be represented as a sequence of samples encoded according to CCIR-601 specifications defined in "Studio Encoding Parameters of Digital Television for Standard 4:3 and Wide-Screen 16:9 Aspect Ratios", CCIR Recommendation 601, 1982. However, the signal may not easily be compressed within the scope of a single line except by taking advantage of properties peculiar to each signal. Such an approach requires, in effect, that the encoder and decoder are programmed with knowledge of the detailed specification of each VITS, VIR or GCR signal, which precludes simple extension of the compression approach to include new types of similar test and reference signals.

Nevertheless, the test and reference signals have the following characteristics in common which are advantageous for purposes of encoding a compressed representation:

The signals are invariant in time over a cycle consisting of a number of fields ranging between one and eight, depending on the system, except possibly for any variation induced by time-dependent signal distortions.

The cyclical variation consists of a defined variation in signal phase, which is normally (though not always)

related to the phase of color burst, that may possibly occur in conjunction with the presence or absence of a signal from a specified field in the cycle.

Considering now the class of VBI signals used for carrying data, several public and proprietary systems have been defined. It is a normal and usual requirement for the introduction of digital television systems in place of existing analog systems that means be provided for the transmission of any and all such signals which may be carried in the pre-existing analog system, and for means to be provided to reconstruct such signals in the analog output signal generated by a digital decoder.

A range of publicly defined standards for use in both NTSC and PAL systems for VBI signals exists, including "World System Teletext and Data Broadcasting System", UK DTI, May 1987, also partly defined in "Teletext System B, 625/50 Television Systems", ITU-R Recommendation 653, DATE? (hereinafter Teletext); "Joint EIA/CVCC Recommended Practice for Teletext: North American Basic Teletext Specification (NABTS)", EIA Recommendation 516, May 1988 (hereinafter NABTS); "Signal Specification for Line 21", EIA Recommendation R-4.3, September 1992 (hereinafter Closed Captioning); "Time and Control Code—Video and Audio Tape for 525-line/60-field Systems", ANSI/SMPTE Recommendation 12M-1986, January 1986 (hereinafter VITC); and "Specification Of Insertion Data Signal Equipment For International Transmissions", EBU Tech. 3217, June 1977 (hereinafter EBU3217).

The following table defines the characteristics of the encoding of data carried in VBI signals for these standards:

the half amplitude point of the first data symbol or the first cycle of a clock run-in sequence, as appropriate.
(7) Bits per line include any digital clock run-in or digital sync sequences subject to the same encoding technique.
(8) At this time only 32 bits per line are defined for use in EBU 3217 but the standard permits extension in multiples of 8 bits to 128 bits per line.
(9) The first bit of closed captioning line is preceded by an analog run-in signal consisting of 7 cycles of a sine wave running at 32 times the NTSC line frequency. Other digital signals, such as defined by "625-line Television Wide Screen Signalling", EBU Draft prETS 300 294, 1993 (hereinafter EBU WSS), which are used in the "PALplus System Specification", June 1994 (hereinafter PALplus), may be placed in one half of a video line where the second half may either contain analog video or analog test or reference signals.
(10) The table is not complete, for example EBU WSS and proprietary systems such as the Nielsen AMOL systems have been omitted.

It will be apparent that all VBI signals have a frequency bandwidth less than 6.75 MHz and can therefore be represented as a line of analog video and encoded at 13.5 Mbps according to CCIR 601; in the case of PAL teletext signals, for which the symbol rate exceeds 6.75 Msymbols/sec, this is achieved by defining a cutoff on the raised cosine filter used to shape the symbols.

It will further be apparent that use of CCIR 601 is a very inefficient means of representing a VBI line transporting binary digital data. The digital data rate required to transmit

|  | Closed Caption (NTSC) | EBU 3217 (PAL) | VITC (NTSC) | VITC (PAL) | NABTS (NTSC) | Teletext (PAL) | Teletext (NTSC) |
|---|---|---|---|---|---|---|---|
| VBI Lines | 21 | 16 | 2 non-adjacent | 2 non-adjacent | 15–18 | Any | Any |
| Burst data rate (Mbps) | 0.50349 | 2.5 | 1.78977 | 1.79687 | 5.72727 | 6.9375 | 5.72727 |
| Multiple of line freq. | 32 | 80 | 113.75 | 115 | 364 | 444 | 364 |
| Bit encoding | NRZ | Biphase | NRZ | NRZ | NRZ | NRZ | NRZ |
| Low level | 0 + 2 IRE | 0 + 30 mV | 0 + 10 IRE | 0 + 25 mV | 0 ± 2 IRE | 0 ± 14 mV | 7.5 ± 1.85 IRE |
| High Level | 50 ± 2 IRE | 500 ± 30 mV | 80 ± 10 IRE | 550 ± 50 mV | 70 ± 2 IRE | 462 ± 42 mV | 72.25 ± 5.5 IRE |
| Rise Time (ns) | 240 + 48 | 200 ± 10 | 200 ± 50 | 200 ± 50 | N/A | N/A | N/A |
| Start ($\mu$s) | 10.5 | 11.6 | 10.0 | 11.2 | 10.48 | ≦11.2 | ≦10.84 |
| Bits per line | 19 | 32–128 | 90 | 90 | 288 | 360 | 296 |

Notes:
(1) VBI line numbers reflect the restrictions defined in the applicable standard and do not necessarily reflect the assignments made by any national authority.
(2) NRZ encoding represents a 0 bit at low level and a 1 bit at high level.
(3) Biphase encoding represents a 0 bit as a transmission from low to high levels and a 1 bit as a transition from high to low levels. A biphase signal may be represented as an NRZ signal at twice the burst data rate.
(4) Signal levels are measured in IRE units for NTSC signals and mV for PAL signals. Deviation is given per analog encoding specs.
(5) Rise time is measured between 10% and 90% amplitude points. Deviation is given per analog encoding specs.
(6) Start time measures the time between half amplitude of the leading edge of the horizontal line sync pulse and a single line per frame, using the techniques of CCIR 601 at 8 bits per PCM sample and 1440 samples per line, is 345.254 kbps for an NTSC signal and 288 kbps for a PAL signal. By comparison, the VBI signal with the highest burst data rate is PAL teletext. The maximum digital data capacity required to represent the data transported in a PAL teletext signal transmitted once per frame is only 9 kbps.

Figure 1B:
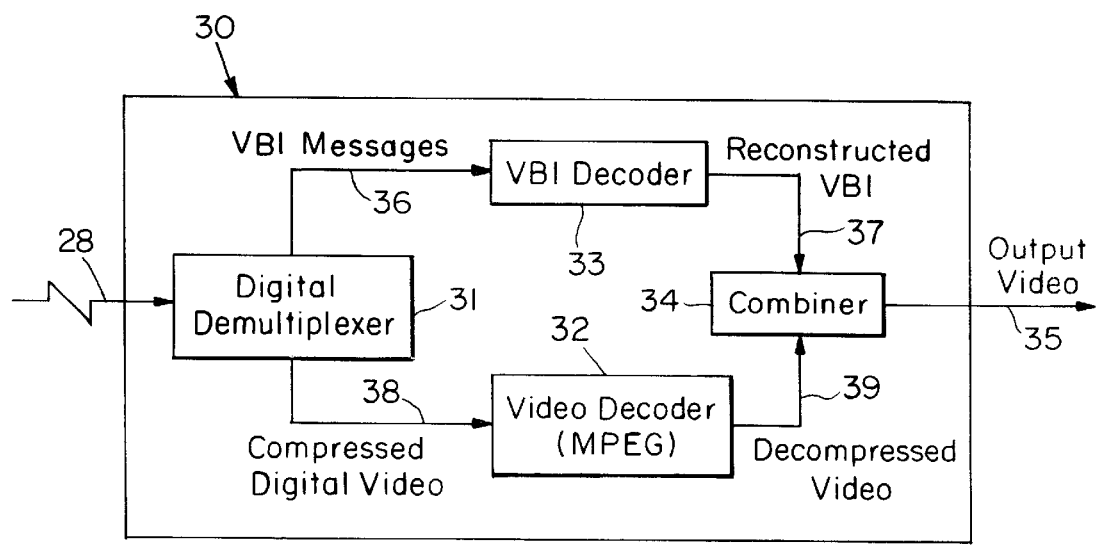

A system embodying the principles of the present invention is shown in FIGS. 1A and 1B. The system comprises an encoding apparatus 20 and one or more decoding apparatus 30. The encoding apparatus 20 accepts as input a video signal 21 such as a composite analog PAL or NTSC signal, or a digital Y,Cr,Cb format. The video signal 21 is split by a splitter 22 which routes the video to a video encoder 23 on line 21B, which performs MPEG digital video encoding and compression, and to a VBI encoder 24 embodying the present invention on line 21A. Other components, such as an audio encoder, may also be present in the encoding apparatus 20. The VBI encoder 24 digitally encodes those VBI lines on the input video signal 21 which have been selected for encoding and transmission, according to the present invention, as described hereinafter. A configuration control system 25 defines for the VBI encoder 24 on line 29 certain expected characteristic and initial parameter values for the VBI lines being encoded, as detailed further below. A digital multiplexer 26 combines the encoded VBI lines 27A with data from other sources 27C, such as MPEG2 digital video and audio, into a single digital transport stream 28. The transport stream is delivered to the decoding systems 30 by any well-known transmission means, including coaxial cable, optical fiber cable, satellite, and land-based microwave.

The decoding system 30 accepts the input transport stream 28 and demultiplex the various components via a digital demultiplexer 31. A video component 38 is routed to a video decoder 32 which converts the digital video from a compressed digital format such as MPEG2 to a decompressed format such as Y,Cr,Cb digital component format. A VBI component 36 is routed to a VBI decoder 33 embodying the present invention. The VBI decoder 33 extracts such encoded VBI lines as are required for presentation, and reconstructs the VBI signal under the same format as the decoded video signal. A combiner 34 combines the reconstructed VBI lines 37 with the decoded video signal 39 and possibly other signals such as audio, and transform their video format to generate an output video signal 35 such as composite analog NTSC or PAL.

The present invention permits transmission of encoded VBI data separately from transmission of other sources. The present invention permits the VBI decoder 33 to decode and insert into the vertical blanking interval information which was not supplied to a VBI encoder 24. For example, VBI data may be supplied to a digital multiplexer 26 directly in digital form 27B with no representation as an analog signal, combined with MPEG2 video signals by the digital multiplexer 26, and decoded by the VBI decoder 33 and inserted in analog form into the output waveform.

Figures 2, 3:
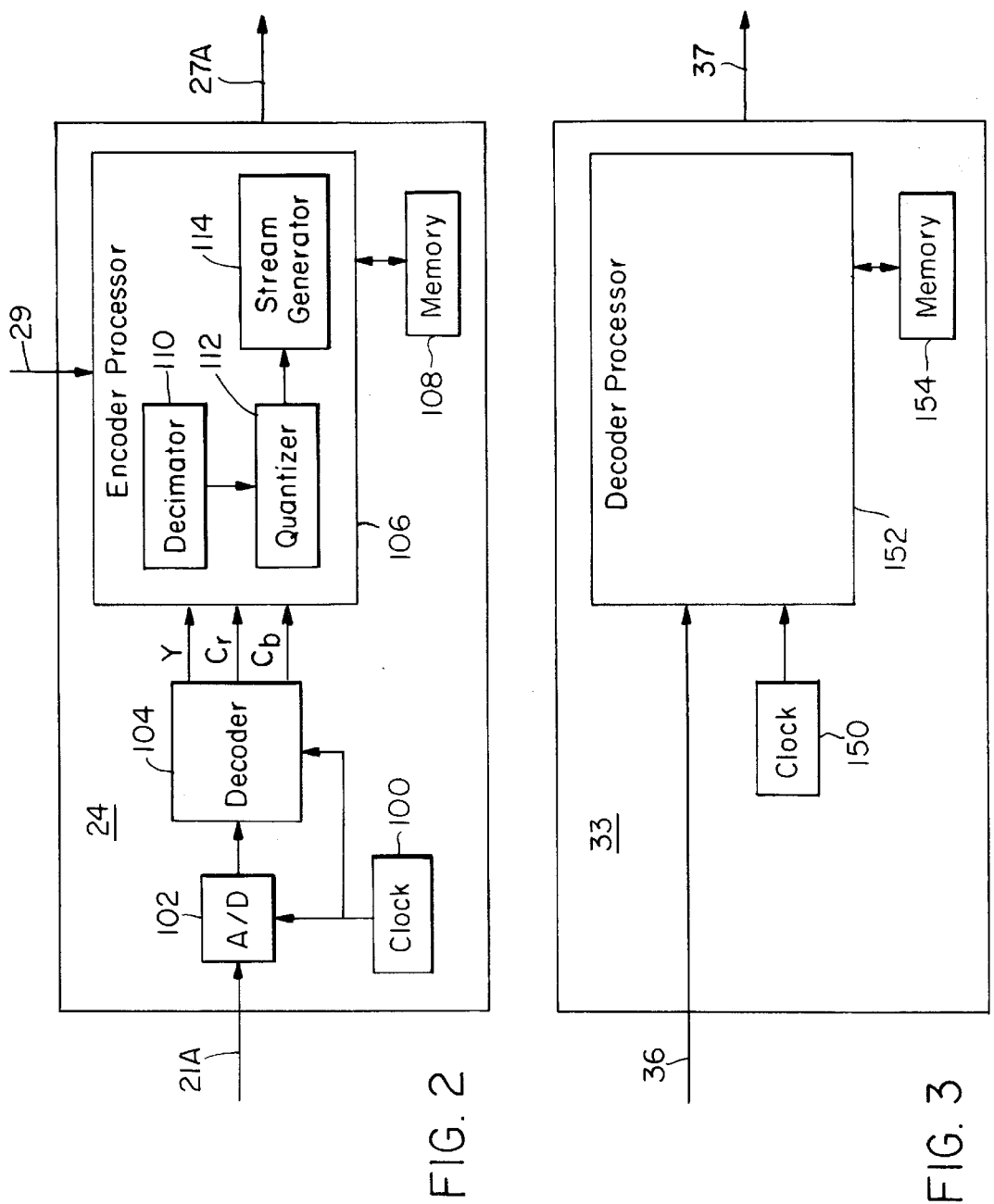
FIG. 2 is a schematic block diagram of a VBI encoder embodiment of the encoding apparatus in FIG. 1A in accordance with the present invention.
FIG. 3 is a schematic block diagram of a VBI decoder embodiment of the decoding apparatus in FIG. 1B in accordance with the present invention.

Referring now to FIG. 2, an embodiment of VBI encoder 24 includes an analog-to-digital converter 102 for sampling the input video signal 21A at a sampling rate derived from clock source 100 that is consistent with CCIR 601. A decoder 104 decodes the samples from the A/D converter 102 into digital video components Y,Cr,Cb. An encoder processor 106 processes the digital video components as described hereinbelow to provide VBI messages at output 27A.

Referring now to FIG. 3, an embodiment of VBI decoder 33 includes a clock source 150, a decoder processor 152 and a memory 154. The decoder processor 152 processes the VBI component 36 to provide a reconstructed VBI signal at output 37 as described hereinbelow.

In the present invention, each line of input VBI subject to encoding is identified by a line number with respect to the first or second field of a frame. In addition, a field number may optionally be associated with a VBI line. This field number, if present, is defined relative to a 4 or 8 field cycle that is optionally aligned with field one of the four-field color burst cycle of NTSC or the eight-field color burst cycle of PAL.

We first describe the encoding process for an individual line of input VBI signal. The steps of this process are shown in FIGS. 4A–4E with particular reference to a VBI data signal. The input signal will have certain characteristics determined by the governing standards, as shown by example for a VBI data signal 200 in FIG. 4A. In the case of test and reference signals, these characteristics will be fixed, except for certain cyclical properties as discussed above, and possibly for certain time-variant distortions, as discussed below. In the case of VBI data signals, each input line 205 may be different as is shown in FIG. 4B.

In either case, the analog video signal must be converted into a component digital signal. In the preferred embodiment, referring again to FIG. 2, the input signal 21A is composite analog and is first digitally sampled at 13.5 MHz in A/D converter 102 and then digitally decoded into luminance (Y) and chrominance (Cr and Cb) components, according to the CCIR 601 standard, in decoder 104. Other input signals, conversion schemes and sampling rates are also possible. In the subsequent discussion, the term "sampling rate" refers to the rate of digital sampling of the input analog signal.

In the case of VBI data signals, the chrominance samples are discarded. The luminance samples of the active portion of each VBI line (as. shown in FIG. 4C by representative sample 206) are further processed in order to reduce the amount of information to be transmitted.

First the encoder processor 106 of VBI encoder 24 estimates the symbol rate B and the position D of the rising edge of the first symbol relative to the start of the active video line. Theoretical values of these parameters are given by the specification of each VBI standard: the theoretical symbol rate B' and the theoretical position of the middle of the rising edge of the first symbol D'. However, in order to ensure an efficient symbol encoding process, the system must use the actual values of these parameters. Deviations of the actual parameters from the theoretical values may be caused by the limited precision of the VBI generator or the limited precision of the 13.5 MHz CCIR 601 sampling clock.

In the preferred embodiment, the position of the rising edge of the first symbol D (as shown in FIG. 4A at 204) is estimated as follows: the portion of the VBI line known to contain digital data is swept once to find the position x of the luminance sample that (1) belongs to a rising edge of the signal and (2) is the closest to the CCIR 601 level equidistant to the level $I_{min}$ of a 'zero' VBI symbol 203 and the level $I_{max}$ of a 'one' VBI symbol 201. If in this process all the samples of the portion of line are found to belong to 'zero' symbols, the VBI encoding process stops and the sequence of symbols (all zeros) is directly transmitted to the multiplexer. Otherwise, the estimated position of the rising edge of the first symbol D 204 is then computed as:

$$D=[int(BD'+0.5-xB+int(xB))+xB-int(xB)]/B$$

where x is an integer expressed in number of samples; D and D' are real values expressed in number of samples; B is a real value expressed as a fraction of the sampling frequency, and is the inverse of the duration of a single symbol 201; and int() is a function that returns the integer part of a real value.

In this process, B is the value of the symbol frequency as estimated at the time of the computation. For VBI data signaled in a given VBI line in a given field, B is the value estimated on the corresponding VBI line in previous frames with the same line and field number. The initial estimates for B and D are B' and D' which, along with $I_{min}$ and $I_{max}$ are provided to the encoder processor 106 of VBI encoder 24 by the configuration control system 25.

As a safety measure and for VBI systems that specify a maximum starting time for the first symbol rather than an exact starting time, such as teletext, the system may verify that no symbol is present within the portion of the VBI line known to contain digital data before the detected D. Since such systems require a run-in sequence starting with a 'one' symbol, this can easily be done by scanning the beginning of the VBI line portion and verifying that the value of the samples between 0 to D does not exceed $(I_{min}+I_{max})/2$. If it does, D is replaced by D-B, and the verification procedure is run again until no symbol is detected in front of D. Other safety measures such as checking the presence and the location of a synchronization word or a run-in sequence can also be implemented to verify the correct positioning of the first symbol in the line.

Once the estimated start of the VBI data is known, the line is swept a second time in order to correct the estimated symbol frequency B, decimate the samples in decimator 110 (FIG. 2) to preserve only one sample per symbol, as shown in FIG. 4D, and quantize these samples in quantizer 112 (FIG. 2) to retrieve the VBI symbols, as shown in FIG. 4E. These three processes take place simultaneously.

In the preferred embodiment, one and only one sample per VBI symbol is preserved in the decimation process. The position $y_i$ of this sample must be the closest to the actual center of the $i^{th}$ VBI symbol. The set of these sample positions is obtained with the following formula:

$$y_i = int(D + i/B + 0.5/B + 0.5) i = 0, \ldots, N-1$$

where $y_i$ is an integer, expressed as a number of samples and N is the number of VBI symbols in the line, as given by the VBI specification.

The subsampled luminance components $y_i$ may be quantized as follows, with respect to a quantization threshold 208 as shown in FIG. 4D:

$$\text{If sample}[y_i] \leq (I_{max}+I_{min})/2 \text{ then } S_i=0$$

$$\text{If sample}[y_i] > (I_{max}+I_{min})/2 \text{ then } S_i=1$$

where sample[n] is the value of the $n^{th}$ luminance sample in the active video line and $S_i$ is the value of the $i^{th}$ symbol.

The resultant set of symbols is the encoded representation of the bits transmitted in the VBI line. Optionally, the VBI encoder 24 may additionally compress these digital bits to take advantage of known redundancies in the system of VBI data being transmitted. A stream generator 114 constructs a VBI message stream from the encoded representation for output on line 27A.

In the preferred embodiment, the estimated symbol frequency B is re-evaluated every time a symbol S(i) is found to be equal to 1 and the previous symbol S(i-1) is found to be equal to 0. The following formula is then used:

$$\text{if sample}[int(D+i/B+0.5)+1] < (I_{max}+I_{min})/2 \text{ then } B=B+\Delta$$

$$\text{if sample}[int(D+i/B+0.5)] > (I_{max}+I_{min})/2 \text{ then } B=B-\Delta$$

B is initialized with the value B' before the first line of VBI is processed by the configuration control system 25. Simulation studies have shown that a value of $\Delta=0.001$ provides sufficient accuracy for this system.

The following table indicates appropriate values of B', D', $I_{min}$ and $I_{max}$ to be used for the data transmission systems analyzed above. The table also indicates the associated data rate that may be achieved if one line per frame is encoded according to the associated parameters. It will be apparent that by selection of appropriate values of these four parameters any VBI signal which transports digital data in a form that may be encoded as an NRZ signal can be encoded by the present invention.

| System | B' | $I_{min}$ | $I_{max}$ | D' | Effective Data Rate (kbps) |
|---|---|---|---|---|---|
| Closed Captioning (NTSC) | 0.037296 | 1 | 117 | 207.44 | 0.569 |
| VITC (NTSC) | 0.132576 | 1 | 188 | 13 | 2.697 |
| VITC (PAL) | 0.133102 | 16 | 188 | 19.2 | 2.25 |
| EBU3217 (PAL) | 0.185185 | 16 | 172 | 24.6 | 1.6–6.4 |
| NABTS (NTSC) | 0.424242 | 1 | 164 | 19.48 | 8.631 |
| Teletext (NTSC) | 0.424242 | 16 | 169 | 24.34 | 8.871 |
| Teletext (PAL) | 0.513889 | 16 | 161 | 19.2 | 9 |

In the case of encoding test and reference signals, the CCIR 601 luminance samples (Y) of the active portion of the VBI line are transmitted to the digital multiplexer for insertion in the MPEG2 stream. The chrominance components (Cr and Cb) may also be transmitted or may be discarded altogether. For each line of VBI processed in a field, the VBI encoder 24 is configured to encode chrominance samples appropriately.

For example, for an NTSC luminance-only VITS signal broadcast once per frame, this transmission scheme would require a bandwidth of 86.314 kbps.

In order to take advantage of the static content of such lines for purposes of compression, the sampled lines may be broadcast at infrequent intervals. For this reason, unless time-variant distortions are detected, the sampling process may optionally only take place once, or, if a reference system consists of a small set of waveforms, once for each member of the set. Optionally, the VBI encoder 24 can derive the second waveform as the opposite polarity of the first. If a cyclical pattern exists for displaying certain lines over a set of fields, then this pattern should also be broadcast to the decoding apparatus 30.

If time variations are detected on a given VBI line that is nominally static, such as a variation caused by low frequency hum, the VBI encoder 24 may decide to re-transmit this VBI line more frequently. The broadcast frequency is also sufficient to allow the VBI decoder 33 to detect the presence of the test or reference signal within a short time of acquiring the digital signal. By this means, the bandwidth required for transmission of a test or reference signal may be reduced substantially. For example, the bandwidth required for transmitting the VITS signal of the preceding paragraph once per second is only 2.87 kbps.

Certain VBI standards allow digital data and either analog test or reference signals or active video to share the same VBI line. In the case of NTSC Closed Caption for example, each line starts with a run-in sine wave. For another example, certain lines are divided between the active video and the VBI. In order to process such lines, a preferred embodiment of the VBI encoder 24 partitions the line into at least two portions and is capable of processing each part of the line separately. For example, in the case of the Closed Caption system above, the VBI encoder 24 is configured to recognize an analog and a digital portion of line 21. In the analog portion of the line, the sine wave may be sampled and broadcast infrequently, while the digital line is sampled and broadcast on each occurrence of line 21.

In the preferred embodiment, the encoded VBI signals are provided as streams of Messages according to the invention disclosed in the above-referenced U.S. application Ser. No. 08/675,558. The VBI signals may be provided by other means, either instead of or in conjunction with the streams of Messages. For example, the binary content of a teletext signal may be determined according to the present invention, and the resultant data may be provided both as a Message according to the above-referenced U.S. Appl. Ser. No. 08/675,558 and as a Teletext stream encoded according to the specifications of DVB Teletext. By this means, decoders conformant to DVB specifications which do not also incorporate the invention disclosed in the referenced U.S. Appl. Ser. No. 08/675,558 may access Teletext data, although signals belonging to other VBI systems that may be provided via Messages will not be accessible.

The decoding process in the VBI decoder 33 (FIG. 1B) will now be described. In order for the VBI decoder 33 to reconstruct a VBI signal given the encoded representation, certain parameters must be supplied to the VBI decoder, including:

The presentation time stamp (PTS) of the frame in which the associated VBI line is to be output, if required. This time stamp is consistent with the video PTS, for example as specified by MPEG2. Note that VBI information which is stored for cyclical replay will not be associated with a PTS.

The number(s) of the field in the frame in which the associated VBI signal is to be output.

The number(s) of the line in the field in which the associated VBI signal is to be output.

Whether the line includes digital data.

If so, the corresponding values for B, D, $I_{min}$, $I_{max}$, and the exact number of samples per line. The VBI encoder 24 may provide either nominal or actual values for these parameters. Nominal values permit the system operator to ensure that the reconstructed signal is as close as possible to VBI standard specifications, while the actual values permit reconstruction of a signal with the actual timing characteristics of the input to the VBI encoder 24.

If so, whether the pulse shape is specific to the VBI data or can be automatically derived from the symbol rate. If the pulse shape is specific, the reference to a pulse shape in the VBI decoder library must be given.

Whether the line includes analog test or reference signals

If so, whether chrominance samples have been retained.

If so, the position of the first luminance (and chrominance) sample in the line and the exact number of samples to be inserted.

Whether the contents are cyclic

If so, whether the cycle must be locked to the phase of color burst of an analog composite video signal, and the fields in the 4 or 8-field cycle in which the VBI line is to be output If not, the presentation time may optionally be presented (e.g. for VITC), as discussed above. If no presentation time is specified then the VBI decoder 33 outputs the signal on the next available occurrence of the specified line.

The VBI decoding process comprises reconstructing the entire digital video line according to the CCIR 601 format. At the output of the VBI decoder 33 (FIG. 1B), the combiner 34 inserts the reconstructed VBI line in the decompressed digital video image obtained from the video decoder 32 (consistent with the presentation time stamp if specified), and transforms this combined digital signal into the appropriate video output format. If the output format is analog composite, the output video encoding process must be consistent with the field number of the VBI line (if specified) in the 4 or 8 field NTSC or PAL cycle.

Figure 5A:
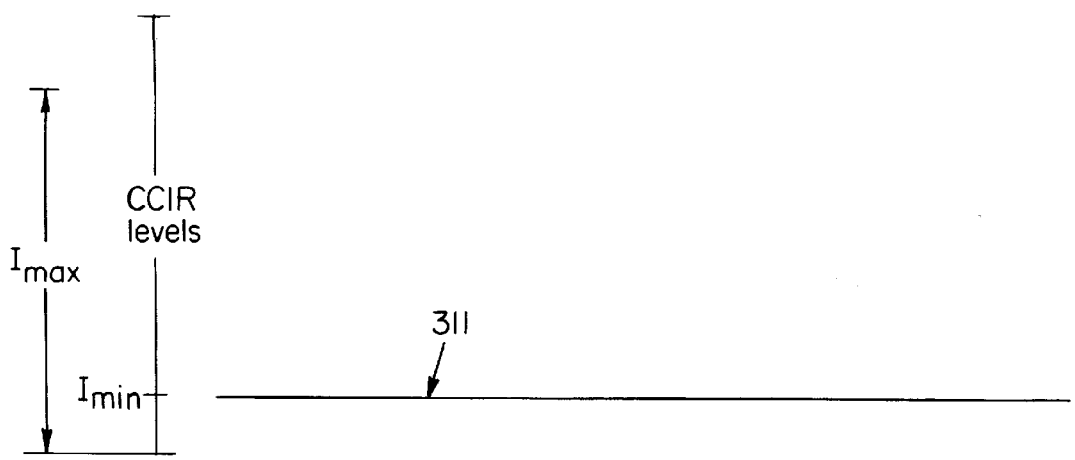
FIGS. 5A–5C illustrate VBI signal decoding of the present invention.
Figure 5B:
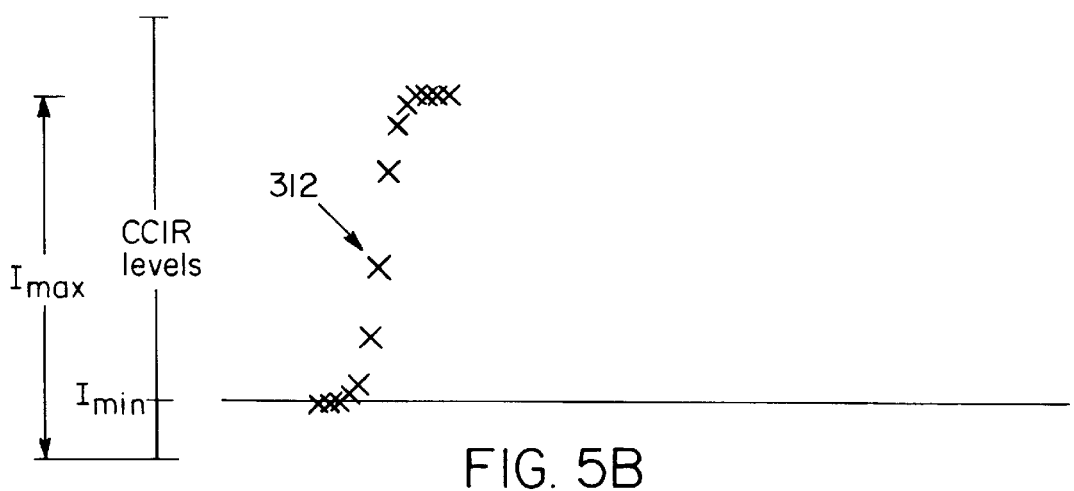
Figure 5C:
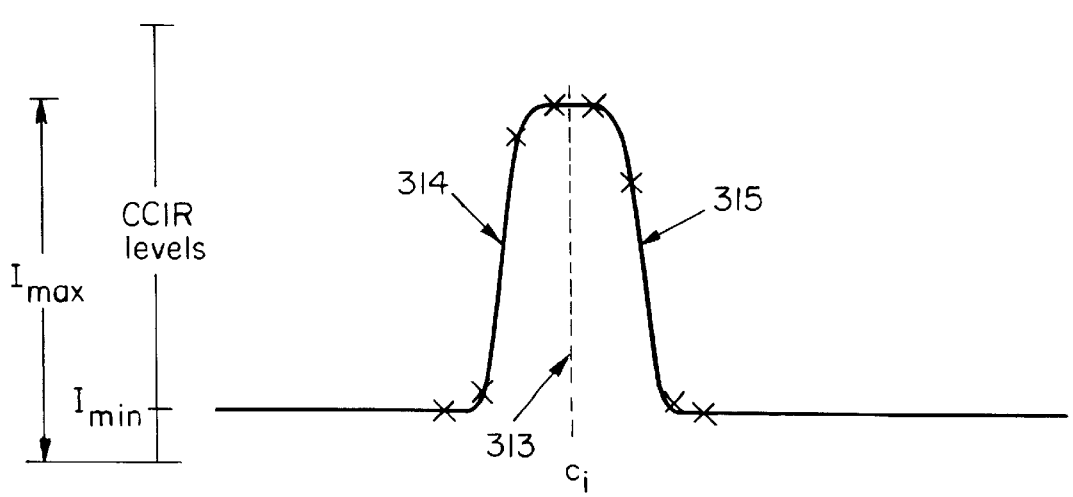

Reconstruction of the VBI signals in the VBI decoder 33 is illustrated in FIGS. 5A–5C with particular reference to VBI data signals. Referring now to FIG. 5A, the digital video line is reconstructed by first preparing a line 311 at $I_{min}$ (zero level for chrominance samples, normally but not necessarily black or blanking level for luminance samples, e.g., these are the same for PAL but different for NTSC).

For test and reference signals, luminance samples and optionally chrominance samples are simply inserted in this blank line 311 at the location described by the parameters transmitted along with the VBI data. The luminance and chrominance samples are obtained from the transmitted data if it is available. Otherwise, the decoder processor 152 (FIG. 3) of VBI decoder 33 determines whether the image of a cyclically repeated line has been saved in memory 154 and whether the current line and field are appropriate for the insertion of this line image. If these conditions are met, then the VBI decoder 33 retrieves the line image and inserts it at the appropriate locations in the blank line, as before.

For VBI data signals, a pulse is copied in the prepared line for each '1' symbol encoded. The VBI decoder 33 builds the pulse and places it at the right location in the video line according to the parameters transmitted along with the VBI data: D or D', B or B', N. $I_{max}$, $I_{min}$, and optionally the reference to a specific pulse shape. If the pulse shape reference is given, the VBI decoder 33 recovers an oversampled image of the pulse from its local pulse shape library in memory 154. If the pulse shape reference is not given, the VBI decoder 33 automatically builds an oversampled image of the pulse according to the symbol rate B or B', the pulse size as given by $I_{min}$ and $I_{max}$ and the following default parameters:

Rise time (PAL): 200±10 ns

Rise time (NTSC): 240±10 ns

Level deviation (low, NTSC): +1.85 IRE

Level deviation (high, NTSC): ±2 IRE

Level deviation (low, PAL): +14 mV

Level deviation (high, PAL): ±30 mV

Note that since all VBI pulses are symmetrical with regard to their middle sample, only one half of the pulse need to be stored in the library or reconstructed by the VBI decoder 33. For an 8 bit PCM video system such as CCIR 601, a 32 times oversampled image of the pulse is sufficient for a correct restitution of the pulse at any location. If higher resolutions are required for PCM sample quantization, then the oversampling of the pulse image must be increased accordingly.

Once the pulse shape has been retrieved or constructed as shown at 312 in FIG. 5B, the VBI decoder 33 scans the sequence of received VBI symbols in order to detect all of the '1' symbols. Referring now to FIG. 5C, if symbol i (i=0, . . ,N−1) is detected to be a '1', the center position $c_i$ 313 of the corresponding pulse is computed with the following formula:

$$c_i = i/B + D + 0.5/B$$

where $c_i$ is a real value expressed in number of samples. The pulse shape is then copied into the video line by adding the value of the pulse shape samples to the value of the luminance samples, on the left 314 and right 315 sides of $c_i$.

For example, if the 32 times oversampled image of the pulse shape is given by the sequence P[n], n=1. .p, where P(0) is the center sample of the pulse and p is the number of samples from the center to the tail of the pulse, and if the $i^{th}$ symbol of the VBI line is a '1', the pulse is resampled and copied into the video line according to the following formula:

$$\text{sample}[int(c_i) - j] = \text{sample}[int(c_i) - j] +$$
$$P[1 + j*32 + int(32*(c_i - int(c_i)) + 0.5)]$$
$$j = 0, \ldots, int((p-1)/32 + int(c_i) - c_i)$$

and $$\text{sample}[int(c_i) + j] = \text{sample}[int(c_i) + j] +$$
$$P[1 + (j-1)*32 + int(32*(int(c_i) -$$
$$c_i + 1.0) + 0.5)]$$
$$j = 1, \ldots, int((p-1)/32 - int(c_i) + c_i)$$

Certain enhancements to the digital demultiplexer 31 (FIG. 1B) in the decoding apparatus 30 provide additional efficiencies and features of the present invention. By identifying the digitally encoded VBI signal as a separate component within a digital transport stream, and combining it in the digital multiplexer 26 with multiple video signals that share the same reference clock, then it is possible for the VBI decoder 33 to select and output the decoded VBI signal in combination with any selected video present in the same transport stream. By this means, if all video signals present share the same reference clock, then a single set of test and reference signals can be provided for all video signals contained within a video multiplex, and any selected data signal in the multiplex can be output simultaneously with any video signal present. Further, it is possible to provide several data streams which can be output as VBI signals in the same VBI line or lines, and by means of selection capabilities provided in the VBI decoder 33 to cause one of these signals to be selected and output at the VBI decoder 33. For example, a multilingual teletext system might allow several languages to be addressed to lines 16–20 in different channels. The different channels may come from different VBI encoders or they may have been generated as externally supplied VBI data streams.

In the preferred embodiment, VBI signals are encoded by the VBI encoder 24 (FIG. 1A) as Messages of type VBI Data (known as "VBI Messages" hereinafter). The VBI Messages may optionally be associated with an MPEG Presentation Time Stamp (PTS). Note that a PTS is required for VITC signals. If a VBI Message is not associated with a PTS, the VBI decoder 33 outputs the signal on the next occurrence of the VBI lines named in the VBI Message, consistent with the presentation cycle for the message as defined below, if appropriate.

The type-dependent control fields of the Message header of the VBI Message in the preferred embodiment are reserved.

The message body of the VBI Message comprises the data required to reconstruct completely the VBI signals for one or more VBI lines. These are supplied as a sequence of VBI_line_image() data items. Each VBI_line_image() supplies the VBI data for one line. A line may be partitioned into two blocks, allowing for a mixture of VBI analog and digital data to be contained within a single line. The syntax for the VBI_line_image() is as follows:

```
VBI_line_image () {
    VBI_line_number                    16
    VBI_block ()
    VBI_block ()
}
VBI_block () {
    VBI_block_length                   16
    VBI_processing                      4
    if ((VBI_processing == 0x0) || (VBI_processing == 0x1)) {
        first_601_sample               12
        presentation_cycle              8
        color_burst_matched             1
        pcm_sample_size                 3
        VBI_block extension_flag        1
        reserved                        3
        VBI_block_extension ()
        reserved                        5
        number_of_VBI_symbols          11
        analog_VBI_data ()
    } else if (VBI_processing == 0x2) {
        data_compression_scheme         4
        pulse_shape                    12
        first_digital_sample           16
        burst_rate_frequency           16
        minimum_symbol_size            10
        maximum_symbol_size            10
        VBI_block_extension_flag        1
        reserved                        3
        VBI block_extension ()
        reserved                        5
        number_of_VBI_symbols          11
        digital_VBI_data ()
    } else {
        reserved [ ]
    }
}
VBI_block_extension () {
    extension_length                    8
    reserved [ ]
}
```

The values given may differ between consecutive messages carried in the same channel, or for the same VBI line. The meaning of these fields is defined as follows.

VBI_line_number: This field specifies the number of the VBI line within the output frame into which the VBI data is to be placed.

VBI_block_length: This field defines the number of consecutive octets following the field which are contained within the VBI block. If there is only one VBI block in the line, then the value of this field is set to 0 for the other VBI block.

VBI_processing: This field defines the type of processing to be performed by the VBI decoder 33 on the transmitted data. Three types are currently defined:

0x0 CCIR 601 encoding
    0x1 CCIR 601 luminance only
    0x2 Digital data signal The following fields are defined for VBI_processing of types 0x0 and 0x1 only:

first_601_sample: This field defines the integer sample position of the first analog sample provided in the analog_VBI_data() field.

presentation_cycle: This field defines which video fields in an 8-field cycle contain the VBI signal contained in the message. The most significant bit represents the first field in the cycle. If a bit is set to '1' then the VBI signal specified by the VBI block is output in the corresponding frame. The field is ignored if the VBI Message contains a PTS. If the VBI Message does not contain a PTS and the VBI signal is to be output once only, the field is set to all 0's. As an example, the following table defines the settings for this field for the test and reference signals defined for NTSC.

| Signal | 0 | 1 | 2 | 3 | 4 | 5 | 6 | 7 |
|---|---|---|---|---|---|---|---|---|
| VITS Multiburst test | 1 | 0 | 1 | 0 | 1 | 0 | 1 | 0 |
| VITS Color-bar test | 0 | 1 | 0 | 1 | 0 | 1 | 0 | 1 |
| VITS Composite radiated | 0 | 1 | 0 | 1 | 0 | 1 | 0 | 1 |
| VIR +ve color phase | 1 | 0 | 0 | 1 | 1 | 0 | 0 | 1 |
| VIR −ve color phase | 0 | 1 | 1 | 0 | 0 | 1 | 1 | 0 |
| GCR-A Zero Pedestal | 0 | 1 | 0 | 1 | 1 | 0 | 1 | 0 |
| GCR-A +ve color phase | 1 | 0 | 0 | 0 | 0 | 0 | 0 | 1 |
| GCR-A −ve color phase | 0 | 0 | 1 | 0 | 0 | 1 | 0 | 0 |
| GCR-B +ve polarity | 0 | 1 | 0 | 1 | 0 | 1 | 0 | 1 |
| GCR-B −ve polarity | 1 | 0 | 1 | 0 | 1 | 0 | 1 | 0 |
| GCR-C +ve polarity | 1 | 0 | 1 | 0 | 0 | 1 | 0 | 1 |
| GCR-C −ve polarity | 0 | 1 | 0 | 1 | 1 | 0 | 1 | 0 | color_burst_matched: This field defines whether the presentation cycle is locked to the color burst, so that the first field of the presentation_cycle corresponds to field 1 of the four-field color burst cycle.
pcm_sample_size: This field defines the number of bits in excess of 8 provided in the analog samples (i.e. 8 to 15 bits per sample).
VBI_block_extension_flag: this field defines the presence of an extension field to the VBI_block.
number_of_VBI_symbols: this field defines the number of VBI symbols in the VBI line. If VBI_processing=0x0, a VBI symbol is defined as the combination of a luminance and a chrominance digital video sample. If VBI_processing=0x1, a VBI symbol is defined as a luminance digital video sample.
VBI_block_extension(): this field is reserved for further developments. If present, the length of the VBI_block_extension field is given by the extension_length field.
analog_VBI_data() contains the sequence of digital video samples of the VBI line and is defined as follows:

```
analog_VBI_data {
    for (i=0; i<number_of_symbols; i++) {
        VBI_symbol
    }
    all zeroes(
        8−(number_of_symbols * bits_per_symbol) mod 8)
        mod 8
}
```

If VBI_processing=0x0, bits_per_symbol is defined as 2*(8+pcm_sample_size) and the video samples are presented in the order Y,Cr,Y,Cb, according to the CCIR 601 standard.
If VBI processing=0x1, bits_per_symbol is defined as (8+pcm_sample_size) and the video samples are presented as a sequence of Y samples.
The following fields are defined for VBI_processing of type 0x2 only.
data_compression_scheme: This field selects any additional data compression scheme superimposed on the VBI data (e.g., run-length encoding). The following values are defined:

| 0x00 | No compression |
|---|---|
| 0x01–0xFF | Reserved |

Additional data needed by these compression schemes (e.g. Huffman Tables) that is passed to the VBI decoder 33 can be defined in a similar manner.
pulse_shape: This field defines the pulse shape to be used to create the output video waveform. The following values are currently defined:

0x0: automatic mode. The pulse shape is automatically computed by the VBI decoder 33 given the burst rate of the VBI line and the characteristic of the PAL/NTSC spectrum.
0x1: PAL teletext
0x2: NTSC teletext
0x3 to 0xfff: reserved
first_digital_sample: This field defines the 13.5 MHz sample position in the active portion of the line in which the rising edge of the first VBI data symbol is to be placed (D or D'), where sample 0 is the first sample in the active line, as a real number. The value represents the true value of the sample position multiplied by $2^5$.
burst_rate frequency: This field defines the burst data rate for the digital data, as a fraction of the sampling rate (B or B'). The value represents the true value of the sample position multiplied by $2^{14}$.
minimum_symbol_size: This field defines, in CCIR 601 sample units at 10 bits resolution, the minimum value of a VBI symbol.
maximum_symbol_size: This field defines, in CCIR 601 sample units at 10 bits resolution, the maximum value of a VBI symbol.
VBI_block_extension_flag: this field defines the presence of an extension field to the VBI_block.
number_of_VBI_symbols: this field defines the number of VBI binary symbols in the VBI line
VBI_block_extension(): this field is reserved for further developments. If present, the length of the VBI_block_extension() field is given by the extension_length field.

The field digital_VBI_data() is defined as a sequence of digital data bits packed into octets, as follows:

```
digital_VBI_data () {
    for (i=0; i<number_of_VBI_symbols; i++) {
        VBI_bit 1
    }
    all_zeroes(8−number_of_VBI_symbols mod 8) mod 8
}
```

The descriptor VBI_data_descriptor() is used within the MPEG Program Stream Map (PSM) or Program Map Table (PMT) to define the set of VBI lines carried in a data channel transporting VBI signals in the preferred embodiment. The set of VBI lines identified in the VBI descriptor is treated as a single service component. The characteristics of the data in each line is defined in the VBI data itself. The format of VBI_data_descriptor() is as follows:

```
VBI_data_descriptor() {
    descriptor_tag                              8
```

| descriptor_length | 8 |
|---|---|
| TCI_reserved | 1 |
| private_data_channel | 15 |
| VBI_lines_field_1 | 8 |
| for (i=0; i< VBI_lines_field_1; i++) { | |
| VBI_line_number | 8 |
| } | |
| VBI_lines_field_2 | 8 |
| for (i=0; i< VBI_lines_field_2; i++) { | |
| VBI_line number | 8 |
| } | |
| } | | descriptor_tag: set to 0xC4.
descriptor_length: set to 4+VBI_lines_field_1+VBI_lines_field_2.
channel_number: identifies a private data channel carrying one or more lines of VBI data.

VBI_lines_field_1: defines the number of VBI lines in this component that belong in the first field of a frame on output.
VBI_line_number: defines the number of a VBI line included in this component, relative to the start of this field.
VBI_lines_field_2: defines the number of VBI lines in this component that belong in the second field of a frame on output.

If a VBI_line_number refers to a line which may also contain active video, it is understood that the line number only refers to the half of the line which is part of the VBI. The actual VBI Messages for this line is constructed to keep the active portion of the line unaffected.

The configuration control system 25 (FIG. 1A) is required to initialize the VBI encoder 24 for encoding each input video line. In order to do this, the configuration control system 25 provides the above configuration information to the VBI encoder 24 for each VBI block in each line. In addition, the configuration control system 25 controls the VBI encoder 24 in at least the following aspects:

selection of actual (B and D) or theoretical (B' and D') values for decoder reconstruction parameters;

transmission rates for messages describing static or cyclic VBI signals.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An encoding apparatus for encoding a television signal having video information and VBI information, the VBI information located in a vertical blanking interval of the television signal, the apparatus comprising:

a splitter for splitting the television signal onto first and second signal paths;

a video encoder coupled to one of the first and second signal paths for receiving the television signal and encoding and compressing the video information of the television signal to provide a compressed digital video stream;

a VBI encoder coupled to another of the first and second signal paths for receiving the television signal and encoding and compressing the VBI information of the television signal to provide a compressed VBI information stream; and a multiplexer coupled to the video encoder and the VBI encoder for multiplexing the compressed digital video stream with the compressed VBI information stream to provide an output transport stream.

2. The encoding apparatus of claim 1 wherein the VBI information comprises a VBI data signal and the VBI encoder comprises:

a sampling circuit for sampling the VBI data signal to provide a sequence of samples;

a decimator for decimating the sequence of samples to provide a sequence of decimated samples;

a quantizer for quantizing the sequence of decimated samples to provide a sequence of VBI data bits; and a stream generator for constructing a compressed VBI information stream from the sequence of VBI data bits.

3. The encoding apparatus of claim 1 wherein the VBI information comprises a VBI reference signal and the VBI encoder comprises:

means for sampling the VBI reference signal to provide a sequence of samples; and means for constructing a compressed VBI information stream from the sequence of samples at a broadcast interval.

4. The encoding apparatus of claim 3 wherein the VBI information comprises a VBI reference signal having a cyclic pattern and the compressed VBI information stream includes information representing the cyclic pattern.

5. The encoding apparatus of claim 1 wherein the VBI encoder encodes and compresses the VBI information according to encoding parameters received from an external configuration control system, the encoding parameters characterizing a VBI data format associated with the VBI information.

6. The encoding apparatus of claim 1 wherein the multiplexer multiplexes an externally generated VBI information stream with the compressed VBI information stream and the compressed digital video stream.

7. The encoding apparatus of claim 1 wherein the VBI information comprises a VBI data signal having a sequence of VBI symbols at a symbol frequency and the VBI encoder comprises:

a sampling circuit for sampling the VBI data signal to provide a sequence of samples;

a decimator for decimating the sequence of samples to provide a sequence of decimated samples wherein each decimated sample represents a respective VBI symbol;

a quantizer for quantizing the sequence of decimated samples to provide a sequence of VBI data bits; and a stream generator for constructing a compressed VBI information stream from the sequence of VBI data bits.

8. The encoding apparatus of claim 7 wherein the VBI encoder further comprises means for estimating the symbol frequency and means for estimating a start of the symbol sequence and wherein the decimator includes means for determining the sequence of decimated samples from the estimated symbol frequency and the estimated start of the symbol sequence.

9. A decoding apparatus for decoding a transport stream having a compressed digital video stream and a compressed VBI information stream wherein the compressed VBI information stream includes a sequence of video samples representing a VBI reference signal having a cyclic pattern and further includes information representing the cyclic pattern, the apparatus comprising:

a demultiplexer for demultiplexing the transport stream to the compressed digital video stream and the compressed VBI information stream;

a video decoder coupled to the demultiplexer for decoding the compressed digital video stream to provide a decompressed video signal;

a VBI decoder coupled to the demultiplexer for decoding the compressed VBI information stream to provide a VBI information signal, the VBI decoder including:

means for extracting the sequence of video samples and the cyclic pattern information from the compressed VBI information stream, means for storing the sequence of video samples and the cyclic pattern information in a memory, and means for retrieving the sequence of video samples from the memory according to the cyclic pattern to provide a reconstructed VBI reference signal; and a combiner for combining the decompressed video signal and the VBI information signal to provide an output video signal.

10. A method of encoding a television signal having video information and VBI information, the VBI information located in a vertical blanking interval of the television signal, the method comprising the steps of:
  encoding and compressing the video information of the television signal to provide a compressed digital video stream;
  encoding and compressing the VBI information of the television signal to provide a compressed VBI information stream; and
  multiplexing the compressed digital video stream with the compressed VBI information stream to provide an output transport stream.

11. The method of claim 10 wherein the VBI information comprises a VBI data signal and the step of encoding and compressing the VBI information comprises:
  sampling the VBI data signal to provide a sequence of samples;
  decimating the sequence of samples to provide a sequence of decimated samples;
  quantizing the sequence of decimated samples to provide a sequence of VBI data bits; and
  constructing a compressed VBI information stream from the sequence of VBI data bits.

12. The method of claim 10 wherein the VBI information comprises a VBI reference signal and the step of encoding and compressing the VBI information comprises:
  sampling the VBI reference signal to provide a sequence of samples; and
  constructing a compressed VBI information stream from the sequence of samples at a broadcast interval.

13. The method of claim 10 wherein the step of encoding and compressing the VBI information includes receiving encoding parameters from an external configuration control system, the encoding parameters characterizing a VBI data format associated with the VBI information.

14. The method of claim 10 wherein the multiplexing step includes multiplexing an externally generated VBI information stream with the compressed VBI information stream and the compressed digital video stream.

15. A method of decoding a transport stream having a compressed digital video stream and a compressed VBI information stream wherein the compressed VBI information stream includes a sequence of video samples representing a VBI reference signal having a cyclic pattern and further includes information representing the cyclic pattern, the method comprising the steps of:
  demultiplexing the transport stream to the compressed digital video stream and the compressed VBI information stream;
  decoding the compressed digital video stream to provide a decompressed video signal;
  decoding the compressed VBI information stream to provide a VBI information signal, wherein the decoding includes:
    extracting the sequence of video samples and the cyclic pattern information from the compressed VBI information stream;
    storing the sequence of video samples and the cyclic pattern information in a memory; and
    retrieving the sequence of video samples from the memory according to the cyclic pattern to provide a reconstructed VBI reference signal; and
  combining the decompressed video signal and the VBI information signal to provide an output video signal.

16. A method of decoding a transport stream having a compressed digital video stream and plural compressed VBI information streams, the method comprising the steps of:
  demultiplexing the transport stream to the compressed digital video stream and the plural compressed VBI information streams;
  selecting one of the plural compressed VBI information streams;
  decoding the compressed digital video stream to provide a decompressed video signal;
  decoding the selected compressed VBI information stream to provide a VBI information signal; and
  combining the decompressed video signal and the VBI information signal to provide an output video signal.

17. A method of reconstructing a VBI reference signal having a cyclic pattern from a compressed VBI information stream, the method comprising the steps of:
  providing a compressed VBI information stream having a sequence of video samples representing a VBI reference signal and information representing the cyclic pattern of the VBI reference signal;
  extracting the sequence of video samples and the cyclic pattern information from the compressed VBI information stream;
  storing the sequence of video samples and the cyclic pattern information in a memory; and
  retrieving the sequence of video samples from the memory according to the cyclic pattern to provide a reconstructed VBI reference signal.

18. The method of claim 17 wherein the video samples comprise luminance and chrominance samples.

19. The method of claim 17 wherein the VBI reference signal comprises a Vertical Interval Reference signal.

20. The method of claim 17 wherein the VBI reference signal comprises a Ghost Cancellation Reference Signal.

21. The method of claim 17 wherein the VBI reference signal comprises a suite of Vertical Interval Test Signals.

22. A method of reconstructing a VBI data signal from a compressed VBI information stream, the method comprising the steps of:
  providing a compressed VBI information stream having a sequence of VBI data bits, the bits being encoded using '1' symbol for a high level and a '0' symbol for a low level, the stream further having reconstruction parameters;
  extracting the sequence of VBI data bits from the compressed VBI information stream;
  storing an oversampled pulse shape image in memory;
  retrieving a copy of the oversampled pulse shape image for each VBI data bit having a '1' symbol; and
  placing the copy at a location of a video output line determined from the reconstruction parameters.

23. The method of claim 22 further comprising constructing the oversampled pulse shape image according to the reconstruction parameters.

24. The method of claim 22 wherein half of the oversampled pulse shape image is stored in memory.

25. The method of claim 22 wherein the step of storing includes storing a plurality of oversampled pulse shape images in a library in memory.

26. The method of claim 22 wherein the VBI data signal comprises a teletext signal.

27. The method of claim 22 wherein the VBI data signal comprises a NABTS signal.

28. The method of claim 22 wherein the VBI data signal comprises a Vertical Interval Time Code signal.

29. The method of claim 22 wherein the VBI data signal comprises a Closed Captioning signal.

30. The method of claim 22 wherein the VBI data signal comprises an EBU 3217 signal.

31. The method of claim 22 wherein the VBI data signal comprises a Wide Screen Signaling signal.

* * * * *